(No Model.)
R. W. OLIVER.
HEDGE AND WIRE FENCE.
No. 346,123. Patented July 27, 1886.
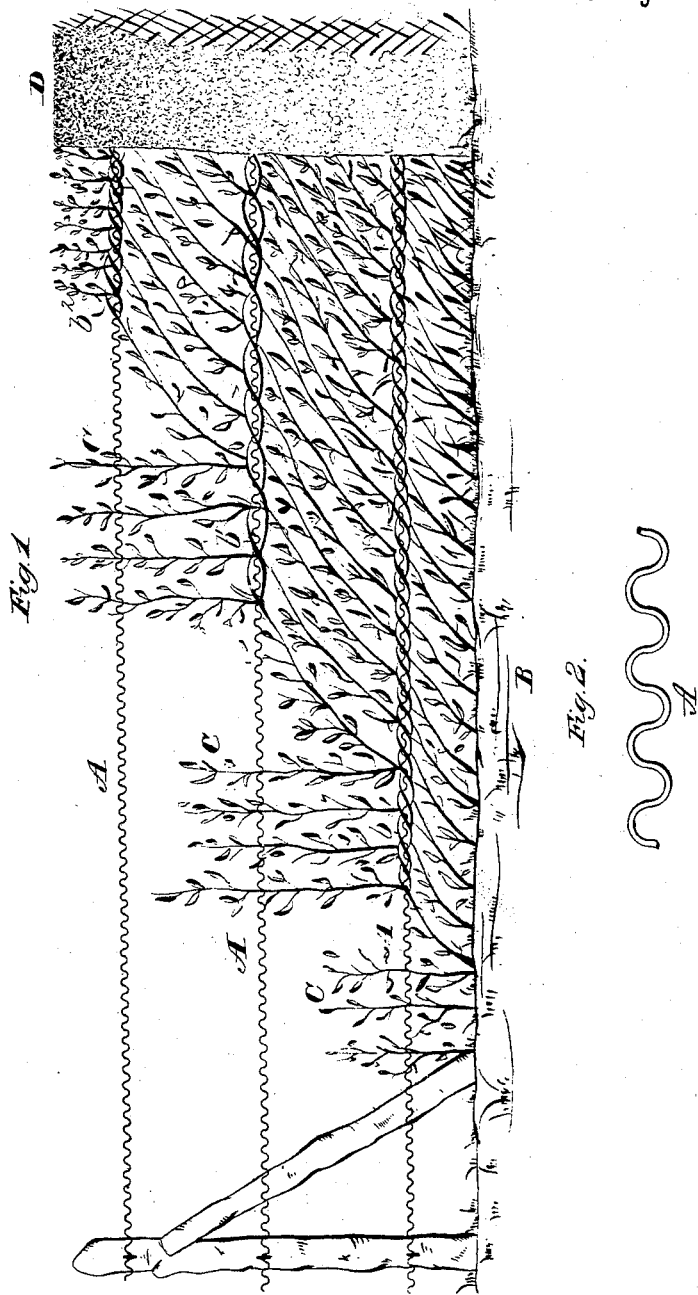
WITNESSES
INVENTOR

UNITED STATES PATENT OFFICE.

REUBEN W. OLIVER, OF LOCKPORT, ASSIGNOR OF THREE-FOURTHS TO LIZZIE S. BECKWITH AND GEORGE A. HOLMES, OF ALBION, NEW YORK.

HEDGE AND WIRE FENCE.

SPECIFICATION forming part of Letters Patent No. 346,123, dated July 27, 1886.

Application filed May 6, 1886. Serial No. 201,365. (No model.)

*To all whom it may concern:*

Be it known that I, REUBEN WILSON OLIVER, of Lockport, in the county of Niagara and State of New York, have invented certain new and useful Improvements in Hedge and Wire Fences; and I do hereby declare the following to be a full, clear, and exact description of the invention, such as will enable others skilled in the art to which it appertains to make and use the same.

My invention relates to an improvement in combined hedge and wire fences; and it consists in a combined hedge and wire fence in which the plants or stock are bent or held down by braiding, twisting, or otherwise suitably engaging them with each other, and with wire crimped, corrugated, or provided with uneven surfaces arranged in different horizontal planes, substantially as herein shown and described, whereby every provision is made for growing a thick hedge by the partly-bent-over position of the plants, in order that the little sprigs as they grow may fill up the hedge.

In the accompanying drawings, Figure 1 is a view in side elevation of a combined hedge and wire fence embodying my invention, and Fig. 2 is a view of one form of wire employed.

A represents a series of horizontal wires arranged at a suitable distance apart, one above the other, and stretched from post to post or other suitable fastenings. These wires, which can be a single wire made up of strands twisted together, are crimped, as shown in Fig. 2, to enable the plants to be wound around the same and held in position thereon without slipping, and also for the purpose of permitting the wire to expand freely without danger of breaking the same or injuring the plants.

B indicates the ground, above the surface of which the lower wire is or may be considerably closer than the distance apart of the several wires from each other.

The plants C, to the extreme left of the drawings, which occupy an upright position, indicate the first year's growth, and the succeeding upright plants C, or portions of plants of different altitudes to the right, indicate, respectively, the second, third, and fourth year's growth, and D represents the complete hedge. The plants as they reach the first year's growth have their canes or stems bent near the ground, and are braided, twisted, or entwined with the lowest crimped wire and with the canes or stems previously wound around the crimped wire. The canes or stems engage the wires at the crimps therein, which not only prevent the canes or stems from sliding longitudinally on the wires, but also prevent canes or stems from unwinding. The twigs which grow up from the canes thus bent over and engaged to successively support one another form the second year's growth, and their canes or portions of stems are in turn similarly bent over and braided or twisted in a supporting manner one with another around the second wire A from the bottom, as shown at $b'$. The same order and manner of proceeding applies to the portions of the plants which are of the third year's growth, the same having their bent parts intertwined or engaged with each other and with the top wire, so as to support one another, as shown at $b^2$. Of course the invention is not restricted to any particular or series of growths and number of wires around which the several growths are arranged.

Having fully described my invention, what I claim as new, and desire to secure by Letters Patent, is—

A combined hedge and wire fence composed of a series of crimped or corrugated wires arranged in different horizontal planes, and a row of hedge-plants bent at different heights corresponding with different periods of their growth, and having their several bent portions braided or intertwined with one another and with the crimped or corrugated wires, substantially as set forth.

In testimony whereof I have signed this specification in the presence of two subscribing witnesses.

REUBEN W. OLIVER.

Witnesses:
 EDWIN L. JEFFERY,
 D. ELWOOD JEFFERY.